United States Patent
Gueret

(10) Patent No.: US 7,102,982 B1
(45) Date of Patent: Sep. 5, 2006

(54) STORAGE APPARATUS AND METHOD UTILIZING A CHARGE STORAGE LAYER HAVING DISCRETE CONDUCTIVE CHARGE-STORING ELEMENTS

(75) Inventor: Pierre Gueret, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 1035 days.

(21) Appl. No.: 09/088,308

(22) Filed: Jun. 1, 1998

(30) Foreign Application Priority Data

May 30, 1997 (GB) .......................................... 97108671

(51) Int. Cl.
*G11B 7/00* (2006.01)

(52) U.S. Cl. ..................................................... 369/126
(58) Field of Classification Search .................. 369/126
See application file for complete search history.

(56) References Cited

U.S. PATENT DOCUMENTS

| | | | | |
|---|---|---|---|---|
| 3,185,968 A | * | 5/1965 | Hammond | 369/126 X |
| 4,490,815 A | * | 12/1984 | Umehara et al. | 369/126 X |
| 5,132,934 A | * | 7/1992 | Quate et al. | 369/126 |
| 5,220,555 A | * | 6/1993 | Yanagisawa et al. | 369/126 |
| 5,289,402 A | * | 2/1994 | Yamamoto et al. | 369/126 X |
| 5,389,475 A | * | 2/1995 | Yanagisawa et al. | 369/126 X |
| 5,396,483 A | * | 3/1995 | Matsuda et al. | 369/126 X |
| 5,519,686 A | * | 5/1996 | Yanagisawa et al. | 369/126 |
| 5,600,137 A | * | 2/1997 | Saito et al. | 369/126 X |
| 5,610,898 A | * | 3/1997 | Takimoto et al. | 369/126 |

* cited by examiner

*Primary Examiner*—Aristotelis M. Psitos
(74) *Attorney, Agent, or Firm*—Casey P. August

(57) ABSTRACT

A storage apparatus comprises a storage medium (27) on which information can be stored in form of electronic charge. The storage medium (27) comprises a plurality of separated electrically conductive charge-storing elements (4) on its surface. The apparatus further comprises a read/write head (28) with which the information can be written to and/or read from the storage medium (27). Additionally, it contains driving means (29, 30, 31) which serves to move the read/write head (28) and the storage medium (27) relatively to each other. The read/write head (28) comprises cantilever means (2) with an electrically conductive read/write tip (1) which is connected to read/write means (24). For writing, a charge-, voltage or current source (33) that delivers the electronic charge is provided. For reading, measure means (36) which measures the electronic charge is provided.

20 Claims, 1 Drawing Sheet

STORAGE APPARATUS AND METHOD UTILIZING A CHARGE STORAGE LAYER HAVING DISCRETE CONDUCTIVE CHARGE-STORING ELEMENTS

TECHNICAL FIELD

The invention relates to a storage apparatus and a storing method, particularly a storage apparatus with electrically conductive charge-storing elements which are located on the surface of a storage medium and a storing/retrieving-method which delivers electronic charge to or measures electronic charge stored on electrically conductive charge-storing elements.

BACKGROUND OF THE INVENTION

A storing apparatus and a storing method for storing digital information in the form of stored charges is known from U.S. Pat. No. 5,132,934. The apparatus comprises a read/write head with a cantilever that carries an electrically conductive tip. Information is stored in form of trapped charges in an insulating layer. Therefore, an electric field is applied which serves to transport the charges into the insulating layer.

The charge sites are situated in a continuous insulating element and are separated from each other through the insulating property of the element. Hence the positions of the charges in the insulating element are not determined by the geometry of the insulating layer but by the position of the read/write head during the writing procedure.

Conductive elements are used as a possibility to provide tracks along which the read/write head is guided.

OBJECT AND ADVANTAGES OF THE INVENTION

It is an object of the invention to provide a storage apparatus and a storing/retrieving method that overcome the drawbacks ocurring in the state of the art.

The storage apparatus according to claim 1 has the advantage that the physical mechanism to transfer the electric charge onto the storage medium is better known and easier to control which renders the storage apparatus less complicated, particularly concerning the control and choice of the parameters of the storage medium. The amount of stored charge is well defined, e.g. a charge unit per Volt, which leads to the fact that the operation parameters can be better defined.

Furthermore, the used storage medium is easier to manufacture, because the requirements that must be complied with are less critical. Hence, also a larger variety of materials is useable for the storage medium, such that the choice of these materials can satisfy other conditions such as long-term stability, heat-resistance or price. While storage in an insulator is subject to local variations of material properties, this is not the fact with the invention.

Since the storing locations are here locally defined by the geometrical dimensions of the charge-storing elements, the fault susceptibility is lower which renders the stored information more reliable. The well defined storage locations allow a tip-positioning error in the order of size of a charge-storing element without failure of read/write procedure.

The precise local definition of the storage locations also results in a larger storing capacity, because the safety margins between the storage locations can be calculated more exactly and hence be minimized. The read/write operation can be done with a realtively low voltage in comparison with insulator-based storage systems.

In the dependent claims various modifications and improvements of the storage apparatus are contained.

A distance-holding means which serves to maintain a predetermined distance between the cantilever means and the surface during scanning is advantageous because with this arrangement the read/write tip is automatically held at a position where the damage risk is reduced or even eliminated. This becomes particularly important when the charge-storing elements are not totally embedded in the surface of the storing medium.

When the distance-holding means comprises a tip that at its contact point to the surface of the storage medium meets the surface at a sharp angle, the distance-holding means automatically slides on the surface with a minimal friction and with minimal risk to create unwanted damages.

The storing medium becomes more compact and less sensitive to damage due to deposition of unwanted material, such as dust particles, when the charge-storing elements are at least partly embedded in or situated upon a layer of insulating material on the electrically conductive substrate element. Also, the read/write process is facilitated because the read/write head faces a smoother surface.

When the charge-storing elements are arranged in the form of an array, the control of the read/write head position is easier since it can be controlled by simply a given row coordinate and a given column coordinate. Additionally the storage density is increased, since two dimensions are used as information area.

The read/write tip is prevented from damage, when during reading from and/or writing to one of the charge-storing elements the read/write tip has a distance from the charge-storing element that allows a tunneling current to flow between them.

When the measure means is arranged to measure a current which flows when the electronic charge is allowed to flow versus a lower potential, then this brings the advantage that a very simple and well-known mechanism of measuring a charge is used which also renders the storing apparatus less complicated.

An advantageous alternative is to measure the force which exists between the read/write tip and the charge-storing elements, because the information is then read nondestructively and need not be refreshed.

The read/write head can be controlled in a linear manner when the driving means comprises a coil and a permanent magnet which are moveable relatively to each other. This arrangement further proves to be very cheap.

When the movement of the coil and the permanent magnet is counteracted through spring means and/or damping means, the driving mechanism of the read/write head can take advantageous use of a zooming effect and a controllable variable spatial resolution which results from the counteraction.

A heating means can be used to facilitate erasing of the stored information which reduces the time needed, respectively work to be done for erasure, particularly for parallel erasure.

One or more additional read/write heads increase the read/write speed since information can be stored/retrieved in parallel.

When each read/write head is moveable relatively to the storage medium over a predetermined motion range of the storage medium the control of the read/write heads is facilitated because the motion range in which the heads are to be moved is restricted and the heads can be moved in parallel with only one driving means.

The arrangement of the read/write heads in form of an array again is a way of increasing store/read speed combined with optimal use of space for storage.

SUMMARY OF THE INVENTION

The storage apparatus according to the invention comprises a storage medium on which information can be stored in form of electronic charge. The storage medium comprises a plurality of separated electrically conductive charge-storing elements on its surface. An example is a metallic disk that is covered on its upper side with an insulating layer which carries metal pads.

The apparatus further comprises a read/write head with which the information can be written to and/or read from the storage medium. The read/write head comprises a cantilever with an electrically conductive read/write tip. For performing a storing and/or reading operation on one metal pad, the tip is positioned at a tunneling distance from or in direct contact with the pad and either deposits or measures charge on the pad.

DESCRIPTION OF THE DRAWINGS

Examples of the invention are depicted in the drawings and described in detail below by way of example. It is shown in FIG. 1: a storage apparatus with a storage medium and an AFM.

All the figures are for sake of clarity not shown in real dimensions, nor are the relations between the dimensions shown in a realistic scale.

DETAILED DESCRIPTION OF THE INVENTION

In the following, the various exemplary embodiments of the invention are described.

Figure 1:
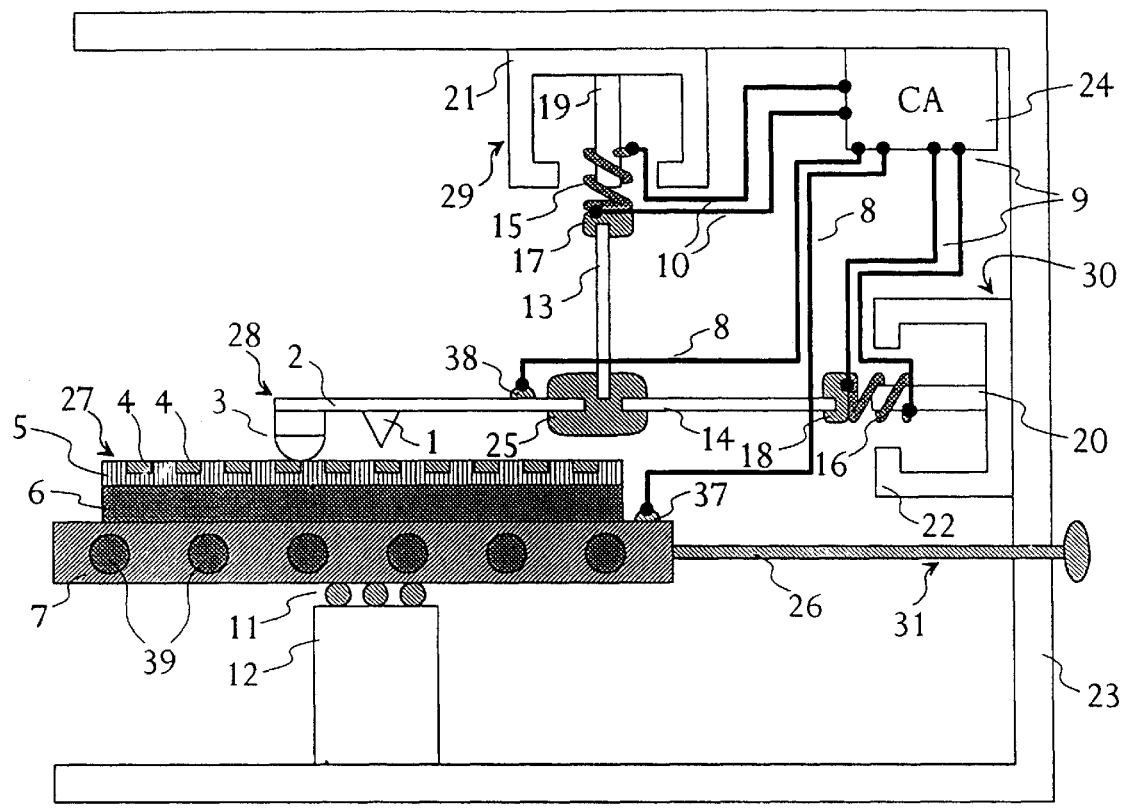

In FIG. 1, a storage apparatus is shown which comprises a first driving means 29 which itself comprises a first permanent magnet 19 which penetrates into a first coil 15. The first coil 15 is fixed at its outer end to a first spring-holding means 17 which holds one end of a first spring means 13 whose opposite end is held in a cantilever-holding means 25. The first permanent magnet 19 is situated in a first pot-like-shaped permanentmagnetic cage element 21. In the same way is arranged a second driving means 30 with a second permanent magnet 20, a second coil 16, a second spring-holding means 18, a second pot-like-shaped permanentmagnetic cage element 22 and a second spring means 14. The first driving means 29 is arranged to provide a movement of the cantilever-holding means 25 in a vertical direction, also called z-direction, while the second driving means 30 is arranged to provide a movement of the cantilever-holding means 25 in a horizontal direction, hereinafter also called x-direction. The first coil 15 is provided with electrical current through first connection lines 10 which lead to a current-, charge- or voltage source 24. The second coil 16 is provided with electrical current through second connection lines 9 which lead also to the current-, charge- or voltage source 24.

A longitudinal cantilever means 2, also called cantilever 2, which is held at one end in the cantilever-holding means 25 bears at its other end a distance-holding means 3 which here is made up of a hard contact element with a very smooth surface and which is held by a flexible element which is attached to the cantilever 2. The cantilever 2 is himself electrically conductive and further bears an electrically conductive read/write tip 1 which is shorter in vertical direction than the distance-holding means 3.

A storage medium 27 comprises an electrically conductive substrate element 6 which is covered with an insulating means 5 in form of an insulating layer. In the upper surface of the insulating layer 5 are embedded various electrically conductive charge-storing elements 4. The storage medium 27 is located on a sample-holding means 7 which has heating means 39 buried in it. The sample-holding means 7 is situated on a bearing 11 which is arranged on a base 12 and is movable via a third driving means 31, comprising a handle 26, which provides for a movement in the horizontal direction.

The cantilever 2 has an electrical contact element 38 and the sample-holding means 7 has another electrical contact element 37, both contact elements 37, 38 being connected via third connection lines 8 to the current-, charge- or voltage source 24.

The whole arrangement is located in a housing 23.

The cantilever 2 with the read/write tip 1, herinafter called tip, is guided by the driving means 29, 30 over the upper surface of the storage medium 27. The third driving means 31 may e.g. be used as a large-scale driving means which is suited for a first rough approach between the tip 1 and a target position on the storage medium 27. The distance-holding means 3 thereby serves to hold the tip 1 automatically at a predetermined distance from the upper surface. In a first embodiment, the tip 1 is held at a distance which allows a tunneling current to flow between the tip 1 and one of the charge-storing elements 4 when being provided with electrical power. In a second embodiment, the tip 1 is allowed to touch the surface, for instance by an actuation means which moves the tip 1 to or from the charge-storing element 4. Furthermore, the distance-holding means 3 should be designed such that it does not damage the surface of the storage medium 27. This is e.g. possible in that it touches the surface at a very small angle, as shown in FIG. 1.

The driving means 29, 30 provide for a driving force acting on the coils 15, 16 by the repelling magnetic fields of the coils 15, 16 and the permanent magnets 19, 20.

The spring means 13, 14 provide each for a counteracting force directed against the driving forces coming from the forces between the coils 15, 16 and the permanent magnets 19, 20. This counteracting force can be predetermined by choosing a suited spring force which on one hand then results in a predetermined demagnification of the excursion of the cantilever-holding means 25, on the other hand gives rise to a choosable variation in spatial resolution of the movement of the cantilever-holding means 25.

The coils 15, 16 are here arranged such that the inhomogeneous part of the magnetic field of the permanent magnets 19, 20 is essentially surrounded by the coil windings. This effect is increased by the pot-like-shaped cage elements 21, 22 which have their upper part, namely the part where the coil extends from the cage element 21, 22, formed such that they direct and concentrate the inhomogeneous field parts of the permanent magnets 20, 21 to the space which is surrounded by the coils 15, 16. This arrangement results in a very linear controllability of the excursion of the coils 15, 16.

One or all driving means 29, 30 can be substituted by any other suitable driving mechanism and can also be varied, e.g. in that one or all spring means 15, 16 are left away, and/or additional damping means is provided, which even can be controllable in its viscosity or deformability by environmental circumstances, such as temperature or pressure. Also the cages 21, 22 need not be present or can be varied in form or even substituted by electromagnetic means.

Figure 2:
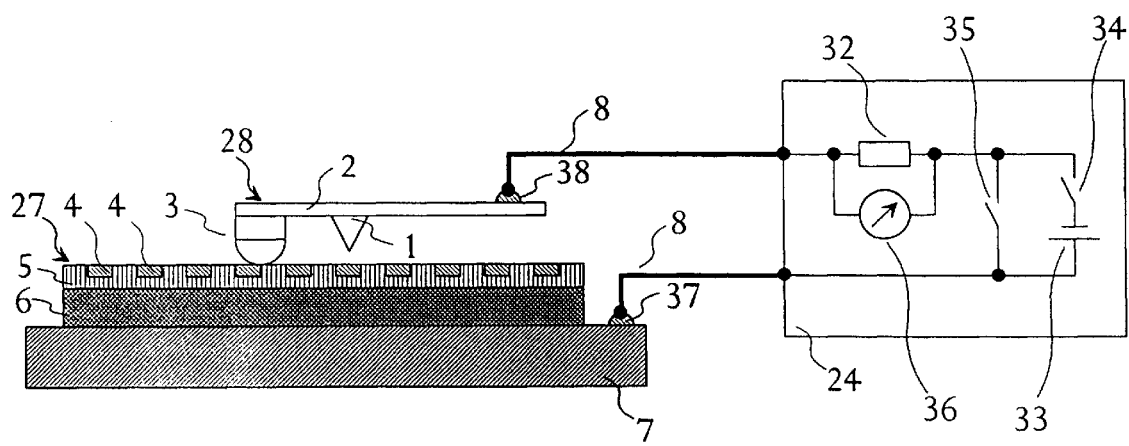
FIG. 2: a storage medium with the circuit arrangement to write and/or read information.

The functionality of the above arrangement concerning storage and retrieval of information is described in combination with FIG. 2.

In FIG. 2, a part of the arrangement of FIG. 1 is depicted, namely the sample holding means 7 with the storage medium 27, the read/write head 28 and the third connection lines 8 together with the source 24. Exemplarily, a circuit arrangement for storage and/or retrieval is shown. The two connection lines 8 are connected with each other via a serial arrangement of a resistive element 32, a first switch 34 and a battery 33. In parallel to the battery 33 and the first switch 34, is arranged a second switch 35. The resistive element 32 is bridged by a measure means 36.

Information is stored by depositing electrical charge on the charge-storing elements 4. The information can then be based on a difference in charge of different charge-storing elements 4. A charged charge-storing element may e.g. represent a logical 1, while in the discharged state it represents a logical 0.

For writing, i.e. deposition of charge, the second switch 35 is left open and the first switch 34 is closed. The battery 33 then closes the connection via the connection lines 8, the cantilever 2, the tip 1, the charge-storing elements 4 and the substrate element 6. The charge-storing element 4 here represents a capacitive load, which is filled with electrical charge. The charging current is limited by the resistive element 32.

For reading information, the first switch 34 is opened and the second switch 35 is closed and the tip brought in contact or at a tunneling distance with the charge-storing element 4. The then flowing current is the discharging current deriving from the charge located on the charge-storing element 4. It is measured by the measure means 36. The discharging current is limited by the resistive element 32.

Another, non-destructive reading operation can be achieved by measuring a force that exists between the charge-storing elements 4 and the tip 1. The described arrangement is perfectly suited for the use of the atomic force as the physical entity to be measured, according to the known Atomic Force Microscope (AFM).

Information can be erased by discharging the charge-storing elements 4, in the case when a charged charge-storing element 4 is considered to be carrying information.

For erasing information, also the heating means 39 can be used. The increase in temperature facilitates charge migration, particularly into the insulating means 5, and hence initiates spontaneous discharging. Such thermally-assisted erasure can also be applied locally restricted, such that certain, selected areas on the storage medium 27 are erased.

A particularly interesting variation of the above described embodiment is the provision of several read/write heads 28, e.g. arranged in form of an array. Then, several read and/or write operations can be done in parallel.

Therefor, individual driving arrangements for the various read/write heads 28 can be provided for, such that each read/write head 28 has its own controllability. The third driving means 31 may then be used as common driving means for a rough approach.

Nevertheless, the various read/write heads 28 may also be coupled together with only one common driving means. Then it is suitable to assign to each read/write head 28 an area on the storage medium 27 which is served by this read/write head 28 only.

To ensure a time-stability of the stored charges and hence of the stored information, it must be taken care that the charges on the charge-storing elements 4 do not decay too rapidly into the adjacent insulating material or into adjacent conducting elements, such as the adjacent charge-storing elements 4 or the substrate element 6. One of the parameters which consequently play an important role is the thickness of the insulating means 5.

As example for the dimensions a thickness of the insulating means 5 of 10 nm, a diameter of circle-shaped charge-storing elements 4 of 10 nm, a resistance of the resistive element 32 of 1 Gigaohm may be taken. The time constant RC will then be approximately 0.1 ns. The charge lifetime is then expected to be several years and the amount of charge stored on a dot is in the order of one charge unit, e.g. electron, per volt of the source 24. The resulting storage density may be in the Terabit/cm$^2$ range.

Another interesting modification is an actuating means which serves to bring the read/write tip 1 into contact with the charge-storing element 4 for reading or writing and release this contact for scanning, when the distance-holding means 3 is present.

What is claimed is:

1. Storage apparatus with a storage medium on which information can be stored in form of electric charge and with a read/write head with which said information can be written to and/or read from said storage medium and with driving means which serves to move said read/write head and said storage medium relatively to each other, said read/write head comprising cantilever means with an electrically conductive read/write tip which is connected to read/write means which for writing comprises a charge, voltage or current source that delivers said electric charge and for reading comprises measure means which measures said electric charge, characterized in that said storage medium comprises a plurality of separated electrically conductive charge-storing elements on its surface, the charge-storing elements defining information storage locations.

2. Storage apparatus according to claim 1, characterized in that it comprises distance-holding means which serves to maintain a predetermined distance between said cantilever means and said surface.

3. Storage apparatus according to claim 2, characterized in that the distance-holding means comprises a tip that at its contact point to the surface of the storage medium meets said surface at a sharp angle.

4. Storage apparatus according to one of claim 1, characterized in that the charge-storing elements are at least partly embedded in or situated upon an insulating element on an electrically conductive substrate element and/or that the charge-storing elements are arranged in form of an array.

5. Storage apparatus according to one of claim 1, characterized in that during reading from and/or writing to one of the charge-storing elements (4) the read/write tip (1) has a distance from said charge-storing element (4) that allows a tunneling current to flow between them.

6. Storage apparatus according to one of claim 1, characterized in that the measure means is arranged to measure a current which flows when the electric charge is allowed to flow versus a lower potential or to measure a force which exists between the read/write tip and the charge-storing elements.

7. Storage apparatus according to claim 1 characterized in that the driving means comprises a coil and a permanent magnet (19, 20) which are moveable relatively to each other.

8. Storage apparatus according to claim 7, characterized in that the movement of the coil and the permanent magnet is counteracted through spring means and/or damping means.

9. Storage apparatus according to claim 1, characterized in that it comprises heating means which serves to facilitate erasing of the stored information.

10. Storage apparatus according to claim 1 characterized in that it comprises at least one additional read/write head.

11. Storage apparatus according to claim 10, characterized in that each read/write head is moveable relatively to the storage medium over a predetermined motion range of said storage medium and/or that the read/write heads are arranged in form of an array.

12. Storage apparatus according to claim 1 wherein each charge-storing element defines a separate information storage location.

13. Storage apparatus according to claim 12 wherein each charge-storing element forms a separate information storage element.

14. Storage apparatus according to claim 1 wherein the charge-storing elements have a dimension on the order of 4 to 10 nm.

15. Method of storing information on and/or retrieving information from a storage medium using a read/write head and driving means which serves to move said read/write head and said storage medium relatively to each other, said read/write head comprising cantilever means with an electrically conductive read/write tip which is connected to rewrite means characterized in that for writing, a charge, voltage or current source delivers electric charge to at least one of a plurality of separated electrically conductive charge-storing elements on the surface of said storage medium and that for reading, measure means measures said electric charge stored on said charge-storing elements, the charge-storing elements defining information storage locations.

16. Method of storing information and/or retrieving information according to claim 15 characterized in that distance-holding means is used which serves to maintain a predetermined distance between said cantilever means and said surface, during scanning and/or during reading and or writing.

17. Method of storing information on and/or retrieving information according to claim 16, characterized in that for reading said information, said electric charge is measured by measuring a current which flows when said electric charge is allowed to flow versus a lower potential or by measuring a force which exists between the read/write tip and the charge-storing elements.

18. Method of storing information on and/or retrieving information from a storage medium according to one of claim 15, characterized in that for erasing said information, the charge-storing elements are heated.

19. Method of storing information according to claim 15 wherein each charge-storing element defines a separate information storage location.

20. Method of storing information according to claim 19 wherein each charge-storing element forms a separate information storage element.

\* \* \* \* \*